Figure 1:
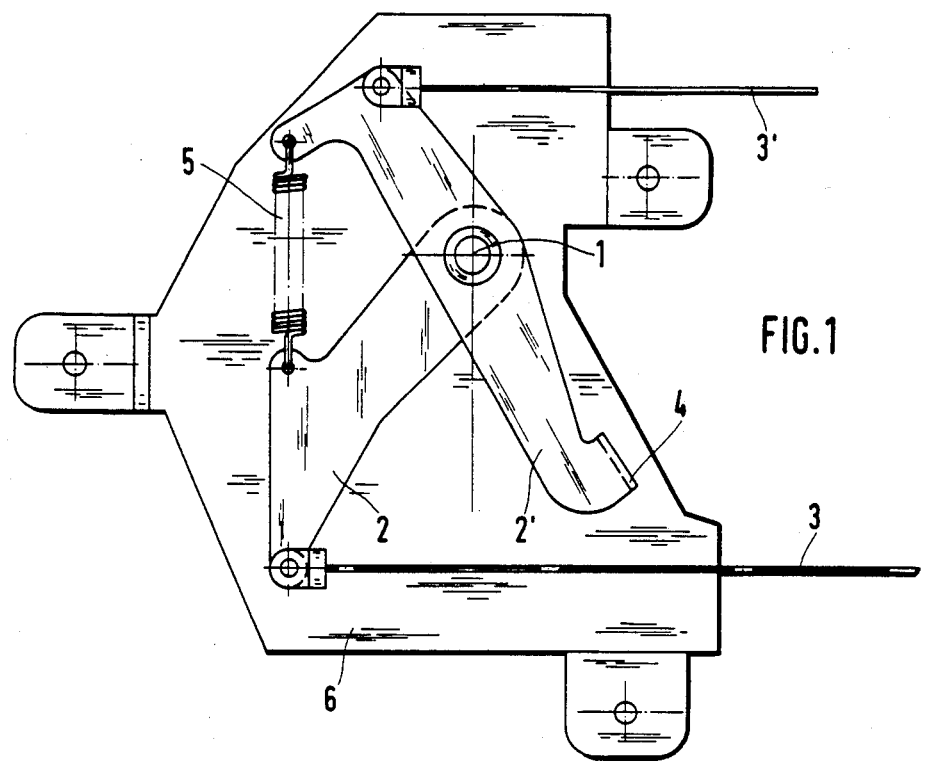

United States Patent [19]

Wegge

[11] Patent Number: 4,733,434
[45] Date of Patent: Mar. 29, 1988

[54] ARRANGEMENT FOR THE COUPLING OF A TOP AND REAR LID OF A VEHICLE HAVING A FOLDING TOP

[75] Inventor: Martin Wegge, Munich, Fed. Rep. of Germany

[73] Assignee: Bayerische Motoren Werke Aktiengesellschaft, Munich, Fed. Rep. of Germany

[21] Appl. No.: 888,227

[22] Filed: Jul. 23, 1986

[30] Foreign Application Priority Data

Jul. 24, 1985 [DE] Fed. Rep. of Germany ....... 3526471

[51] Int. Cl.$^4$ .............................................. E05D 7/00
[52] U.S. Cl. ........................................ 16/365; 16/374; 16/323; 49/121; 296/76
[58] Field of Search ................. 16/319, 346, 343, 365, 16/371, 223, 374, 323; 220/334; 49/94, 116, 121; 296/76, 107; 312/199

[56] References Cited

U.S. PATENT DOCUMENTS

| | | | |
|---|---|---|---|
| 499,140 | 6/1893 | Myers | 220/334 |
| 1,526,752 | 2/1925 | Langford | 220/334 |
| 2,800,361 | 7/1957 | Kubacka | 16/365 |
| 3,052,496 | 9/1962 | Frey . | |
| 3,211,494 | 10/1985 | Husko | 16/374 |

OTHER PUBLICATIONS

Webster New International Dictionary of the English Language, 2nd Ed., 1961, p. 784.

Primary Examiner—Nicholas P. Godici
Assistant Examiner—Gerard M. Reid
Attorney, Agent, or Firm—Barnes & Thornburg

[57] ABSTRACT

A blocking mechanism for the top and rear lid of a motor vehicle with a convertible top, in which the ends of a cable or of a rod are secured at a distance from the respective lid axis at the top and rear lid and at a pivot part supportable at the body. Additionally, an abutment is formed at one pivot part which, during the opening of the coordinated top or rear lid, acts on the second pivot part. As a result thereof, either an opening of the top or rear lid coordinated to the second pivot part is prevented or, during the opening of the top or rear lid, the respectively other top or rear lid is closed.

8 Claims, 2 Drawing Figures

ARRANGEMENT FOR THE COUPLING OF A TOP AND REAR LID OF A VEHICLE HAVING A FOLDING TOP

The present invention relates to a locking mechanism for the top and rear lids of a motor vehicle with a foldable (convertible) top which overlap in their pivot areas.

With such types of motor vehicles, it may be necessary for space reasons to place the pivot axes of the top lid and rear lid so close to one another that during the simultaneous opening the top lid and rear lid impact at one another and are thereby damaged.

It is therefore the principal object of the present invention to provide a blocking mechanism for the top lid and rear lid of a motor vehicle with a convertible top which prevents a contact of the top lid with the rear lid.

The underlying problems are solved according to the present invention in that the ends of a cable or of a rod are secured at the top lid as well as at the rear lid and, at a distance from the respective pivot axis, at a corresponding pivot part pivotal at the body, whereby an abutment is formed at one pivot part which during the opening of the coordinated top or rear lid so interacts on the second pivot part that either an opening of the top or rear lid coordinated to the second pivot part is prevented or during the opening of the top or rear lid the respectively other top or rear lid is closed. It is always assured in this advantageous manner that the two lids cannot come in contact with one another. A further advantage resides in the fact that the blocking mechanism is operable automatically in dependence on the positions of the top and rear lid.

Figure 2:
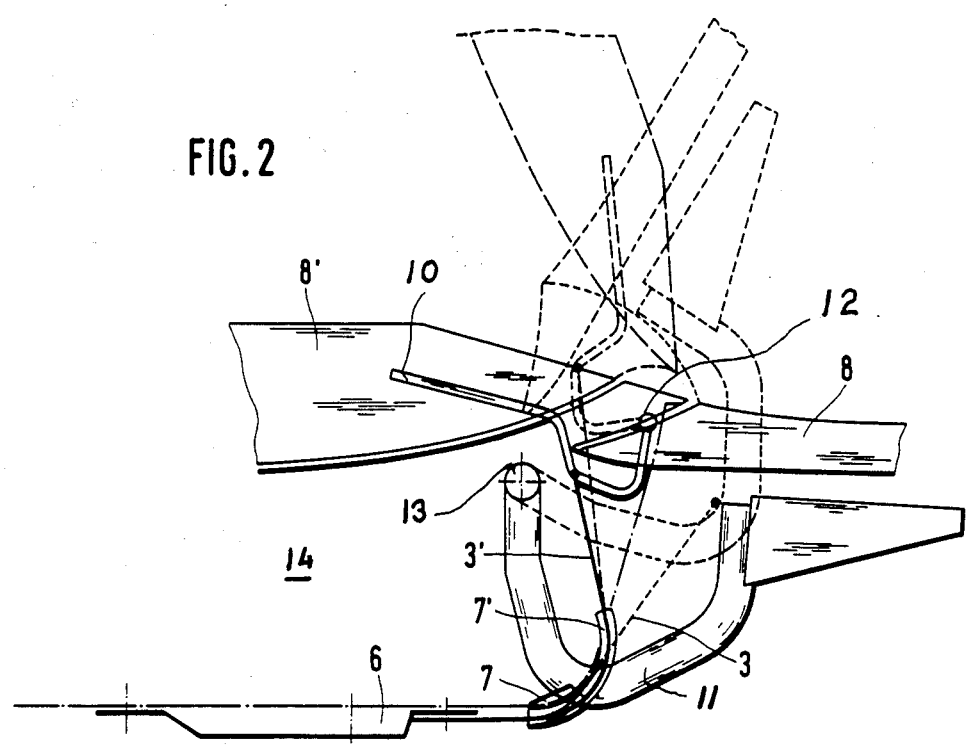

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on the blocking mechanism in accordance with the present invention with two pivot levers pivotal within limits with respect to one another by way of two Bowden cables; and FIG. 2 is a side elevational view showing the location in a vehicle of the fastening plate 6 of the blocking mechanism of FIG. 1 and showing two pivotal connections of the top and rear lid bearing member.

Referring now to the drawing wherein like reference numerals are used throughout the two views to designate like parts, and more particularly to FIG. 1, a blocking mechanism is illustrated in this figure in plan view as a component shortly prior to the installation in a motor vehicle with a convertible top, which once installed prevents a contact of the top lid and rear lid. The blocking mechanism thereby includes two pivot levers 2 and 2' pivotal independently of one another about a common pivot axis 1, which rotatably support one end of a cable 3 and 3' at a distance from the common pivot axis 1. One of the two levers is constructed as two-armed pivot lever 2' with approximately oppositely disposed lever arms of which one receives the cable 3' and the other an abutment 4 at its projecting end. A tension spring 5 is connected with the legs of the two pivot levers 2 and 2' supporting the cable ends which in the installed condition of the blocking mechanisms stresses the two cables 3 and 3' in tension. In the illustrated embodiment, the abutment 4 is formed at the two-armed pivot lever 2' by a section bent at right angle up to the plane of the other pivot lever 2. However, the abutment could also be formed by another structural part, for example, by a separate component which is supported by a pivot part and cooperates with the other pivot part. In lieu of a common pivot axis 1, a pivot axis could be provided for each pivot part. It is also possible, for example, to utilize the coupling member of a four-jointed transmission as the pivot part whereby the abutment can be formed-on at the coupling member or one of the pivot members. In the illustrated embodiment, the common pivot axis 1 is formed at a fastening plate 6 which is adapted to be connected from below with the bottom of the top compartment from the luggage space; the bottom of the top compartment thereby forms a forward upper boundary wall of the luggage space. However, the pivot parts could also be supported at a bearing bracket or the like. Elongated apertures are provided in the bottom of the top compartment which extend approximately in the draw direction of the cables 3 and 3'. The fastening of the blocking mechanism at the vehicle body can take place, for example, in that initially with an opened top lid 8' (see FIG. 2) screws or bolts are screwed through the elongated apertures into corresponding threads in the fastening plate 6, disposed below the bottom, only so far that the fastening plate 6 remains displaceable in the longitudinal direction of the elongated apertures. The free cable ends are then connected with the respectively coordinated top lid 10 bearing member and rear lid 11 bearing member at a distance from their pivot axis 12 and 13 respectively and the rear lid 8 is closed whereby the fastening plate 6 together with the bolts or screws can be moved back to the ends of the elongated apertures. The blocking mechanism can now be moved forwardly by way of the opened top compartment 14 so far until the abutment 4 comes into abutment at the one-armed pivot lever 2 when the top lid is completely opened as shown in dotted lines. In this position, the fastening plate 6 is fixed by tightening the screws or bolts.

A side view showing the location of the plate 6 of the blocking mechanism is illustrated in FIG. 2 whereby the respective closing and opening position of the top lid 8' and of the rear lid 8 are indicated. In order to protect both cables 3 and 3' against damages, the latter are for the most part surrounded with a spacing by a flexible cable sleeve. Furthermore, for the support and deflection of the cables 3 and 3' to the places of pivotal connection at the top lid 8' and at the rear lid 8, cable guidances 7 and 7' are provided which are connected with the fastening plate 6 or by way of corresponding mounting supports with the body. The cable guidances 7 and 7' are constructed for receiving the cable sleeves and fix the same at least within certain areas. In the illustrated embodiment, cables 3 and 3' are utilized for the movement transmission of the top lid 8' and of the rear lid 8 to the pivot parts. However, it is also possible to utilize in lieu thereof rods or rod gears, eventually under interposition of deflection or reversing levers.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A coupling arrangement for a vehicle having a convertible top, a top lid and a rear lid which lids have overlapping areas in their open positions comprising: two pivotal coupling element means that can be displaced with respect to one another, at a point remote from respective pivots of the element means; one pivotable coupling element means being connected with the top lid; the other coupling element means being connected with the rear lid; the top and rear lids being pivotable independently of one another until one coupling element means contacts a stop means provided at the other coupling element means; said contacting of one coupling element means and the stop means preventing opening of the top and rear lids to the overlapping area; and wherein pivoting of either of the top lid or the rear lid into its open position causing one of said coupling element means to close the respective other lid or hold it in the closed position; said two coupling element means each comprising a lever that can be pivoted at the body of the vehicle, independently of the lever of the other coupling means; each of said pivot levers having a transmission element coupled to an arm of said pivot levers and with the one of said top and rear lid respectively, and wherein said transmission element is a cable.

2. A coupling arrangement according to claim 1, further comprising spring means for stressing the levers.

3. A coupling arrangement according to claim 2, wherein said spring means is a tension spring which is secured with its ends at the two pivot leers at a distance to the respective pivot axis of the two pivot levers.

4. A coupling arrangement for a vehicle having a convertible top, a top lid and a rear lid which lids have overlapping areas in their open positions comprising: two pivotal coupling element means that can be displaced with respect to one another, at a point remote from respective pivots of the element means; one pivotable coupling element means being connected with the top lid; the other coupling element means being connected with the rear lid; the top and rear lids being pivotable independently of one another until one coupling element means contacts a stop means provided at the other coupling element means; said contacting of one coupling element means and the stop means preventing opening of the top and rear lids to the overlapping area; and wherein pivoting of either of the top lid or the rear lid into its open position causing one of said coupling element means to close the respective other lid or hold it in the closed position; said two coupling element means each comprising a lever that can be pivoted at the body of the vehicle, independently of the lever of the other coupling means; each of said pivot levers having a transmission element coupled to an arm of said pivot levers and with the one of said top and rear lid respectively, and wherein both pivot levers are independently rotatably supported about a common pivot axis.

5. A coupling arrangement for a vehicle having a convertible top, a top lid and a rear lid which lids have overlapping areas in their open positions comprising: two pivotal coupling element means that can be displaced with respect to one another, at a point remote from respective pivots of the element means; one pivotable coupling element means being connected with the top lid; the other coupling element means being connected with the rear lid; the top and rear lids being pivotable independently of one another until one coupling element means contacts a stop means provided at the other coupling element means; said contacting of one coupling element means and the stop means preventing opening of the top and rear lids to the overlapping area; and wherein pivoting of either of the top lid or the rear lid into its open position causing one of said coupling element means to close the respective other lid or hold it in the closed position; said two coupling element means each comprising a lever that can be pivoted at the body of the vehicle, independently of the lever of the other coupling means; each of said pivot levers having a transmission element coupled to an arm of said pivot levers and with the one of said top and rear lid respectively, and further comprising spring means for stressing the levers to continuously bias both lids to a closed position regardless of the position of the lids.

6. A coupling arrangement according to claim 5, wherein said spring means is a tension spring which is secured with its ends at the two pivot levers at a distance to the respective pivot axis of the two pivot levers.

7. A coupling arrangement for a vehicle having a convertible top, a top lid and a rear lid which lids have overlapping areas in their open positions comprising: two pivotal coupling element means that can be displaced with respect to one another, at a point remote from respective pivots of the element means; one pivotable coupling element means being connected with the top lid; the other coupling element means being connected with the rear lid; the top and rear lids being pivotable independently of one another until one coupling element means contacts a stop means provided at the other coupling element means; said contacting of one coupling element means and the stop means preventing opening of the top and rear lids to the overlapping area; and wherein pivoting of either of the top lid or the rear lid into its open position causing one of said coupling element means to close the respective other lid or hold it in the closed position; said two coupling element means each comprising a lever that can be pivoted at the body of the vehicle, independently of the lever of the other coupling means; each of said pivot levers having a transmission element coupled to an arm of said pivot levers and with the one of said top and rear lid respectively, and wherein the stop means is formed at one end of one arm of a two-armed pivot lever comprising one of the coupling element means and the other end of the two armed pivot lever means engaging the transmission means.

8. A coupling arrangement for a vehicle having a convertible top, a top lid and a rear lid which lids have overlapping areas in their open positions comprising: two pivotal coupling element means that can be displaced with respect to one another, at a point remote from respective pivots of the element means; one pivotable coupling element means being connected with the top lid; the other coupling element means being connected with the rear lid; the top and rear lids being pivotable independently of one another until one coupling element means contacts a stop means provided at the other couping element means; said contacting of one coupling element means and the stop means preventing opening of the top and rear lids to the overlapping area; and wherein pivoting of either of the top lid or the rear lid into its open position causing one of said coupling element means to close the respective other lid or hold it in the closed position; said two coupling element means each comprising a lever that can be pivoted at the body of the vehicle, independently of the lever of the other coupling means; each of said pivot levers having a transmission element coupled to an arm of said pivot levers and with the one of said top and rear lid respectively, and wherein said stop means is formed by an abutment at a pivot lever which is bent off at right angle up to a plane of the other pivot.

* * * * *